Figure 1:
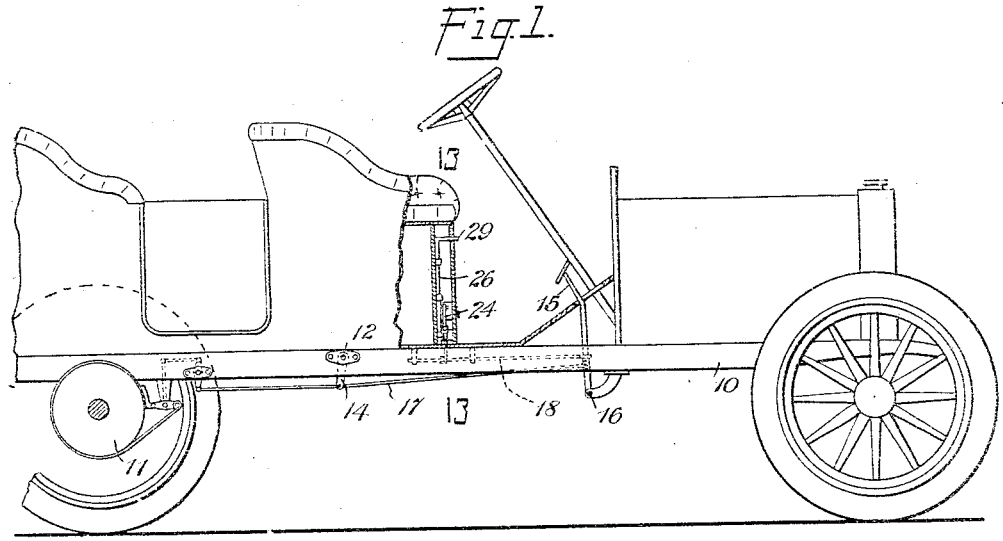

A. H. MARHENKE.
VEHICLE ALARM.
APPLICATION FILED DEC. 26, 1913.

1,123,774.

Patented Jan. 5, 1915.
2 SHEETS—SHEET 1.

WITNESSES
George L. Blume.
Geo. L. Beeler

INVENTOR
August H. Marhenke
BY Munn & Co.
ATTORNEYS

A. H. MARHENKE.
VEHICLE ALARM.
APPLICATION FILED DEC. 26, 1913.
1,123,774.
Patented Jan. 5, 1915.
2 SHEETS—SHEET 2.
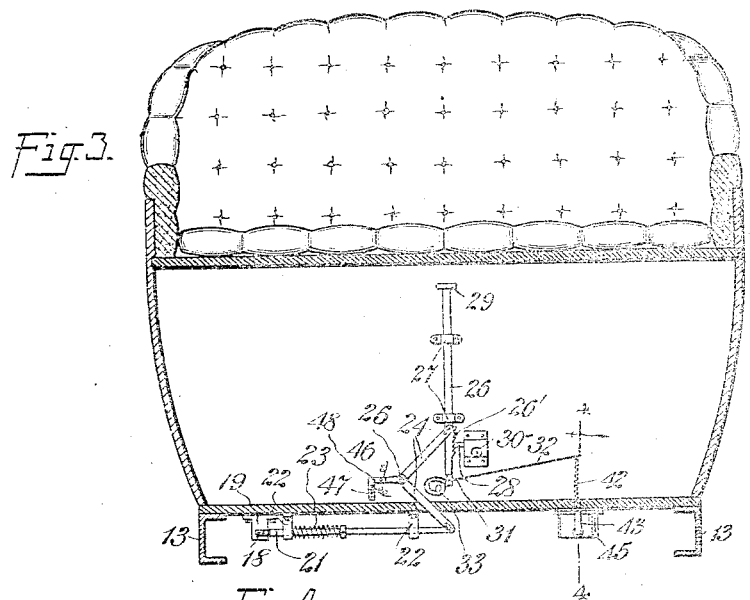
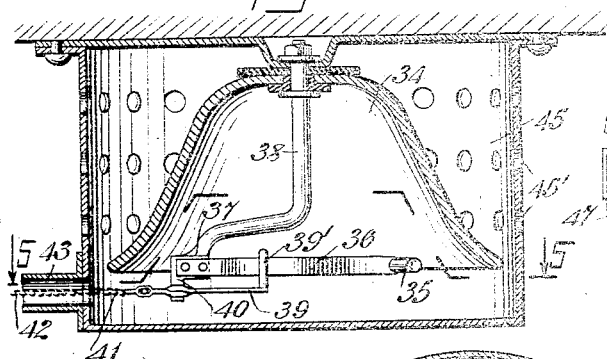
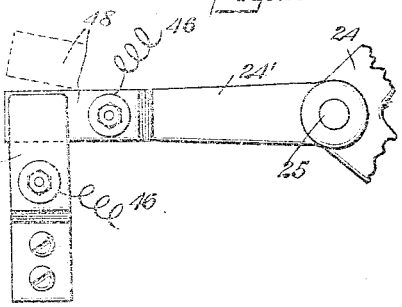
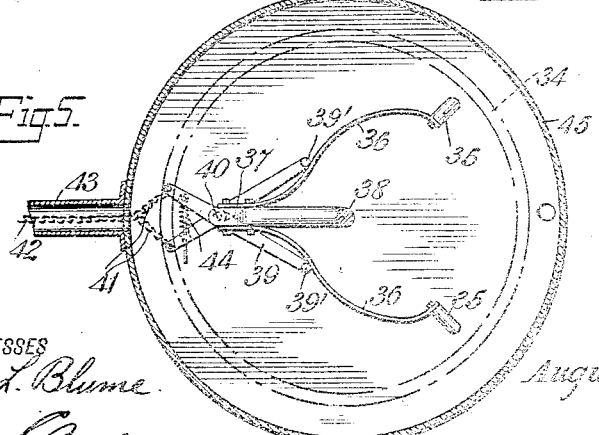
WITNESSES
George L. Blume
Geo. H. Beeler
INVENTOR
August H. Marhenke
BY Munn & Co.
ATTORNEYS

UNITED STATES PATENT OFFICE.

AUGUST HEINRICH MARHENKE, OF NEW YORK, N. Y.

VEHICLE-ALARM.

1,123,774.   Specification of Letters Patent.   Patented Jan. 5, 1915.

Application filed December 26, 1913. Serial No. 808,809.

*To all whom it may concern:*

Be it known that I, AUGUST H. MARHENKE, a citizen of the United States, and a resident of the city of New York, borough of the Bronx, in the county of the Bronx and State of New York, have invented a new and Improved Vehicle-Alarm, of which the following is a full, clear, and exact description.

This invention relates to vehicles and has particular reference to safety appliances serving to prevent the loss of vehicles by thieves or other malicious persons.

More definitely stated the invention comprises a form of brake mechanism which is adapted to be set in locking position when the driver of the vehicle leaves the same standing on the street, such means being under the control of the driver by the use of a key to enable him to place the vehicle in running condition after he returns, and means furthermore being provided whereby, if the vehicle should be moved by a stranger an audible alarm will be sounded whereby an indication will be given to the public or to the law officers that the vehicle is being tampered with without authority.

The foregoing and other objects of the invention will hereinafter be more fully described and claimed and illustrated in the drawings forming a part of this specification in which like characters of reference indicate corresponding parts in all the views, and in which—

Figure 2:
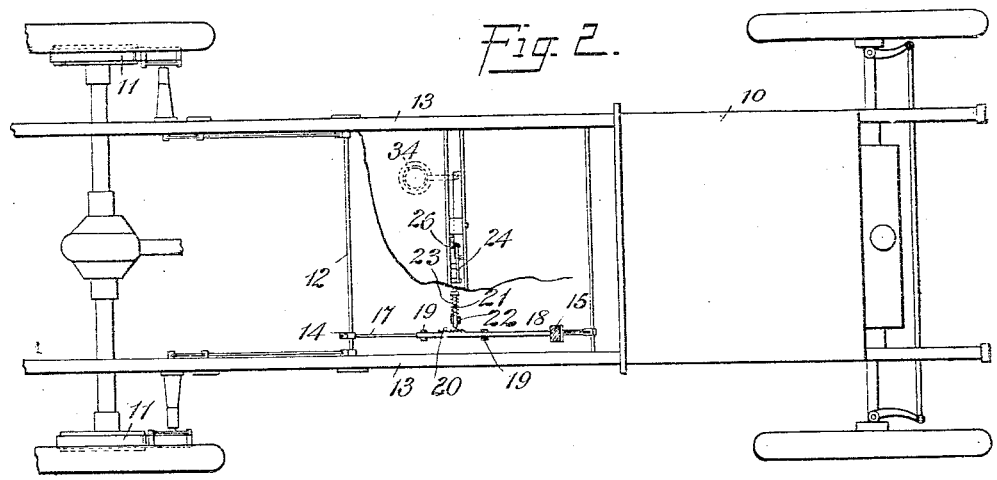

Figure 1 is a side elevation of an automobile, partly in section, equipped with this improvement; Fig. 2 is a fragmentary plan view of the chassis of the same; Fig. 3 is a vertical transverse section substantially on the line 3—3 of Fig. 1; Fig. 4 is a vertical section on the line 4—4 of Fig. 3; Fig. 5 is a horizontal section on the line 5—5 of Fig. 4; and Fig. 6 is a detail described below.

The several parts of the device may be made of any suitable materials, and the relative sizes and proportions, as well as the general design of the mechanism, may be varied to a considerable extent without departing from the spirit of the invention hereinafter more fully set forth and specifically claimed.

Referring now to the drawings more specifically, I show at 10 an automobile which may be regarded as an example of any carriage or wagon of any known type with which my device is adapted to be employed. This vehicle is shown comprising a band brake 11 associated with each of the rear wheels, the lever mechanism of the brake being operated from a single rock shaft 12 journaled transversely in the frame 13 and to which is connected a lever 14. As an illustration of one means for operating the brake in the usual manner I show a foot lever 15 pivoted at 16 to some fixed point and having a rod 17 connecting it with the aforesaid rock shaft 12.

Associated in any convenient manner with one of the movable parts of the brake mechanism such, for instance, as the lever 15, is a bar 18 slidable along keepers 19 and having a series of teeth 20 thereon. A plunger 21 operates in keepers 22 preferably at right angles to the axis of the bar 18 and is adapted, when forced against the tension of a spring 23, to engage one of the teeth of the bar so as to prevent its movement to the open position of the brake. Said plunger 21 at its end or any other point remote from the end engaging the teeth 20 is connected to a bell crank 24 pivoted at a fixed point 25 preferably beneath the driver's seat and adapted to operate in a vertical plane. The upper arm of the bell crank or the arm opposite that one to which the bell crank is connected is loosely connected to a plunger 26 guided for reciprocation vertically in keepers 27. Said plunger 26 is provided with teeth 26′ with which a key controlled locking bolt 28 coöperates. When the driver wishes to leave the vehicle standing on the street he may set the brake by his foot in the usual manner, and then, by depressing the plunger 26 through a finger piece 29, he will cause the bell crank to be moved around its pivot 25 far enough for the plunger 21 to interlock with one of the teeth 20 of the brake bar 18. The bolt 28 will automatically coöperate with the teeth 26′ to lock the plunger 26 in the position into which the driver depresses it and thereby the plunger 21 will be locked in engagement with the bar 18 against the tension of the comparatively stiff spring 23. On the return of the driver or other person authorized, he may apply a key to the lock 30 so as to release the plunger 26, whereupon the spring 23 will automatically withdraw the plunger 21 so as to set free the brake bar.

The plunger 26 is so mounted and arranged as to bear downwardly at 31 upon a spring 32 secured at one end to the frame at 33 in a fixed position. At 34 I show an audible alarm device, for instance, in the form of a bell which will be of a peculiar character either with respect to the quality of tone or size and which will be recognized by the public or the policemen on the street that the vehicle is being operated without authority. I provide adjacent the bell peculiar mechanism comprising one or more hammers 35 each mounted on a flexible arm 36. The ends opposite the hammers are secured in a definite fixed position close together at 37 at the lower end of a fixed post 38 constituting a means for securing the bell 34 in position. The lower end of said post 38 is offset, as shown in Fig. 4, at the point where the arms 36 are secured. When the arms 36 are set free, the hammers carried thereby occupy positions close to the perimeter of the bell 34, and the motion of the vehicle at such a time will cause sufficient vibration for one or both of said hammers to strike the bell.

Any suitable means may be provided to secure the hammers from operating when the vehicle is being driven by the proper person. For this purpose I show a pair of levers 39 of the first class pivoted on the same pivot 40 adjacent the point of connection 37 above described. Each of said levers has a finger 39′ adapted to bear against one of said flexible arms 36. When the ends of the levers opposite said fingers are drawn toward each other, said fingers 39′ will likewise be drawn toward each other, causing the hammers 35 to be so closely drawn together as to remove them from the position where any possibility of their striking the bell will be eliminated. To thus control the position of the levers 39 I connect to such free ends thereof short flexible members 41 from which leads a flexible member such as a chain 42 leading through a guide 43 and having its opposite end connected to the above described spring 32. The normal tendency of the spring 32 is to automatically draw upon the chain 42 to cause the hammers to be drawn into inoperative position and against the tendency of a lighter spring 44 to keep the hammers separated or closer to the rim of the bell. It will thus be seen that when the plunger 26 is depressed into locking position, as above described, the spring 32 will be forced downwardly, relieving the normal tension upon the chain 42 and thus allowing the spring 44 to set the hammers free for their intended operation. If, therefore, should the vehicle be started while the devices are thus set, the bell will be sounded. If the mechanism above described, for instance, were connected to a horse-drawn vehicle, it might be possible, under certain conditions, for the vehicle to be started even if the brakes were set and locked, but the sounding of the bell would indicate immediately that something was wrong and the offender could hardly make his escape with the vehicle under such conditions.

The guide 43 extends from a casing 45 which substantially incloses the bell so as to prevent any one from tampering with the bell mechanism, but provided with a sufficient number and size of openings 45′ for the sound to pass through.

In the case of automobiles having electrical sparking devices for their motors, I may provide, in connection with the bell crank 24, an automatic cut-off for the electric circuit between the magneto or battery and the engine cylinders, said circuit being indicated in Fig. 6 by wires 46. Said wires are shown connected to switch blades 47 and 48, the one being secured in fixed position and the other carried by an arm 24′ of the bell crank. It will be plain that when the bell crank 24 is moved, as above described, to cause the locking of the brake bar 18, the switch blade 48 will be thrown to the position indicated in dotted lines in Fig. 6, thereby making it impossible for the ignition mechanism to perform its intended functions.

Having thus described my invention, I claim as new and desire to secure by Letters Patent:—

1. The herein described vehicle including brake mechanism, locking devices therefor, said locking devices including a plunger, an audible alarm mechanism including a bell, a hammer for the bell, means to hold the hammer from striking the bell under normal operating conditions, and devices between said plunger and said hammer holding means whereby, when the brake mechanism is set, the hammer will be free to vibrate, but when the brake is released the hammer will be held from action.

2. The combination with a vehicle having brake mechanism including a depressible plunger, of audible alarm devices including a bell, a hammer adjacent the bell, lever mechanism adjacent the hammer, a spring 44 acting upon the lever mechanism tending to allow the hammer to ring the bell when the vehicle is in motion, and means acting normally upon the lever mechanism and against the force of said spring to hold the hammer out of operation, said means acting upon the lever mechanism being actuated by the plunger when depressed to allow free movement of the hammer through said spring when the brake mechanism is set.

3. In safety devices for vehicles, the combination of a bell crank pivoted at a fixed point, a plunger connected to one arm of the bell crank and serving to move it around its pivot, means controlled by said bell crank movement to prevent the movement of the vehicle, audible alarm mechanism normally held out of operation when the vehicle is driven with safety, and connections between said plunger and said alarm mechanism whereby the alarm mechanism is set free for operation when the plunger is depressed and the bell crank moved as first described.

4. In safety devices for vehicles, the combination of a member movable by hand, means associated with said member to prevent the unauthorized movement of the vehicle when said member is moved in one direction, audible alarm mechanism, a spring arm acted upon by said member when moved as above described, and connections between said spring arm and said alarm mechanism whereby the latter is free to operate when the said member is moved as first described, against the tension of said spring arm, the arm tending to hold the alarm mechanism out of operation.

5. The herein described audible alarm mechanism for vehicles, the same including a bell, a stationary post within the bell serving as a means for securing the bell in position, a pair of hammers mounted on flexible arms connected to the opposite end of said post, lever mechanism pivoted on said post serving to coöperate with said arms to hold the hammers out of position to strike the bell, a spring and flexible connection between the spring and said lever mechanism tending to hold the hammers out of striking position, and hand operated mechanism serving to control the usual running of the vehicle and coacting with said spring so as to set free said hammers when the vehicle is not to be run.

In testimony whereof I have signed my name to this specification in the presence of two subscribing witnesses.

AUGUST HEINRICH MARHENKE.

Witnesses:
 GEO. L. BEELER,
 PHILIP D. ROLLHAUS.